US011809993B2

(12) United States Patent
Al-Rfou et al.

(10) Patent No.: US 11,809,993 B2
(45) Date of Patent: Nov. 7, 2023

(54) SYSTEMS AND METHODS FOR DETERMINING GRAPH SIMILARITY

(71) Applicant: Google LLC, Mountain View, CA (US)

(72) Inventors: Rami Al-Rfou, Mountain View, CA (US); Dustin Zelle, Brooklyn, NY (US); Bryan Perozzi, Cranford, NJ (US)

(73) Assignee: GOOGLE LLC, Mountain View, CA (US)

(*) Notice: Subject to any disclaimer, the term of this patent is extended or adjusted under 35 U.S.C. 154(b) by 875 days.

(21) Appl. No.: 16/850,570

(22) Filed: Apr. 16, 2020

(65) Prior Publication Data
US 2020/0334495 A1 Oct. 22, 2020

Related U.S. Application Data

(60) Provisional application No. 62/835,899, filed on Apr. 18, 2019.

(51) Int. Cl.
*G06N 3/084* (2023.01)
*G06N 20/20* (2019.01)
*G06N 3/02* (2006.01)
*G06F 18/22* (2023.01)
*G06N 3/045* (2023.01)
*G06V 10/82* (2022.01)

(52) U.S. Cl.
CPC .............. *G06N 3/084* (2013.01); *G06F 18/22* (2023.01); *G06N 3/02* (2013.01); *G06N 3/045* (2023.01); *G06N 20/20* (2019.01); *G06V 10/82* (2022.01)

(58) Field of Classification Search
CPC ........ G06N 3/084; G06N 20/20; G06N 3/045; G06N 3/02; G06V 10/82; G06F 18/22
See application file for complete search history.

(56) References Cited

U.S. PATENT DOCUMENTS

2019/0354689 A1* 11/2019 Li ..................... G06F 21/563
2020/0285944 A1*  9/2020 Lee .................... G06F 16/9024
2021/0326389 A1* 10/2021 Sankar ................ G06N 20/10

OTHER PUBLICATIONS

Zhu, Ganggao et al. Computing Semantic Similarity of Concepts in Knowledge Graphs. IEEE Transactions on Knowledge and Data Engineering, vol. 29, Issue 1, Jan. 1, 2017, pp. 77-85. (Year: 2017).*

(Continued)

*Primary Examiner* — Brian M Smith
*Assistant Examiner* — Shamcy Alghazzy
(74) *Attorney, Agent, or Firm* — Dority & Manning, P.A.

(57) ABSTRACT

The present disclosure provides computing systems and methods directed to algorithms and the underlying machine learning (ML) models for evaluating similarity between graphs using graph structures and/or attributes. The systems and methods disclosed may provide advantages or improvements for comparing graphs without additional context or input from a person (e.g., the methods are unsupervised). In particular, the systems and methods of the present disclosure can operate to generate respective embeddings for one or more target graphs, where the embedding for each target graph is indicative of a respective similarity of such target graph to each of a set of source graphs, and where a pair of embeddings for a pair of target graphs can be used to assess a similarity between the pair of target graphs.

20 Claims, 7 Drawing Sheets

(56) References Cited

OTHER PUBLICATIONS

Xu, Xiaojun et al. Neural Network-based Graph Embedding for Cross-Platform Binary Code Similarity Detection. CCS '17: Proceedings of the 2017 ACM SIGSAC Conference on Computerand Communications Security, Oct. 30, 2017, pp. 363-376. (Year: 2017).*

Abu-El_Haija et al., "Learning Edge Representations via Low-Rank Asymmetric Projections", CIKM 2017 International Conference on Information and Knowledge Management, Nov. 6-10, 2017, Pan Pacific, Singapore, pp. 1787-1796.

Abu-El-Haija et al., "Watch Your Step: Learning Node Embeddings via Graph Attention", $32^{nd}$ Conference on Neural Information Processing Systems, Dec. 2-8, 2018, Montreal, Canada, 11 pages.

Artetxe et al., "Learning principled bilingual mappings of word embeddings while preserving monolingual invariance", 2016 Conference on Empirical Methods in Natural Language Processing, Nov. 1-5, 2016, Austin, TX, pp. 2289-2294.

Bai et al., "Graph Edit Distance Computation via Graph Neural Networks", arXiv:1808.05689v1, Aug. 16, 2018, 7 pages.

Battaglia et al., "Relational inductive biases, deep learning, and graph networks", arXiv:1806,01261v3, Oct. 17, 2018, 40 pages.

Berlingerio et al., "NetSimile: A Scalable Approach to Size-Independent Network Similarity", arXiv:1209.2684v1, Sep. 12, 2012, 12 pages.

Bojchevski et al., "Deep Gaussian Embedding of Graphs: Unsupervised Inductive Learning via Ranking", arXiv:1707.03815v3, Oct. 30, 2017, 13 pages.

Borgwardt et al., "Protein function prediction via graphkemels", Bioinformatics, vol. 21, No. 1, 2005, pp, i47-i56.

Borgwardt et al., "Shortest-path kernels on graphs", Fifth IEEE International Conference on Data Mining (ICDM'05), Nov. 27-30, 2005, Houston, TX, 8 pages.

Bunke et al., "A Comparison of Algorithms for Maximum Common Subgraph on Randomly Connected Graphs", Structural, Syntactic, and Statistical Pattern Recognition, LNCS 2396, 2002, pp. 123-132.

Cao et al., "Deep Neural Networks for Learning Graph Representations", Thirtieth AAAI Conference on Artificial Intelligence (AAAI-16), Feb. 12-17, 2016, Phoenix, AZ, pp. 1145-1152.

Cavallari et al., Learning Community Embedding with Community Detection and Node Embedding on Graphs, CIKM 2017 International Conference on Information and Knowledge Management, Nov. 6-10, 2017, Pan Pacific, Singapore, pp. 377-386.

Chen et al., "A Tutorial on Network Embeddings", arXiv:1808.02590v1, Aug. 8, 2018, 23 pages.

Chen et al., "Harp: Hierarchical Representation Learning for Networks", Thirty-Second AAAI Conference on Artificial Intelligence (AAAI-18), Feb. 2-7, 2018, New Orleans, LA, pp. 2127-2134.

Chorowski et al., "Attention-Based Models for Speech Recognition", Twenty-ninth Conference on Neural Information Processing Systems, Dec. 7-12, 2015, Montreal, Canada, 9 pages.

Chung et al., "A Generative Model—the preferential attachment scheme", Complex Graphs and Networks, Chapter 3, American Mathematical Society, 2006, pp. 55-74.

Cui et al., "A Survey on Network Embedding", arXiv:1711.08752v1, Nov. 23, 2017, 21 pages.

Debnath et al., "Structure-Activity Relationship of Mutagenic Aromatic and Heteroaromatic Nitro Compounds. Correlation with Molecular Orbital Energies and Hydrophobicity", Journal of Medicinal Chemistry, vol. 34, No. 2, 1991, pp. 786-797.

Dobson et al., "Distinguishing Enzyme Structures from Non-enzymes Without Alignments", Journal of Molecular Biology, vol. 330, No. 4, 2003, pp. 771-783.

Epasto et al., "Is a Single Embedding Enough? Learning Node Representations that Capture Multiple Social Contexts", 2019 World Wide Web Conference, May 13-17, 2019, San Francisco, CA, 11 pages.

Gao et al., "A survey of graph edit distance", Pattern Analysis and Applications, vol. 13, No. 1, 2010, pp. 113-129.

Gilmer et al., "Neural Message Passing for Quantum Chemistry", $34^{th}$ International Conference on Machine Learning, Aug. 6-11, 2017, Sydney, Australia, 10 pages.

Grover et al., "node2vec: Scalable Feature Learning for Networks", $22^{nd}$ ACM SIGKDD International Conference on Knowledge Discover and Data Mining, Aug. 13-17, 2016, San Francisco, CA, 10 pages.

Haasdonk et al., "Learning with Distance Substitution Kernels", Pattern Recognition, DAGM 2004, Lecture Notes in Computer Science, vol. 3175, pp. 220-227.

Hamilton et al., "Inductive Representation Learning on Large Graphs", $31^{st}$ Conference on Neural Information Processing Systems (NIPS 2017), Dec. 4-9, 2017, Long Beach, CA, 11 pages.

Kang et al., "Fast Random Walk Graph Kernel", 2012 SIAM International Conference on Data Mining, Apr. 26-28, 2012, Anaheim, CA, pp. 828-838.

Kashima et al., "Marginalized Kernels Between Labeled Graphs" $20^{th}$ International Conference On Machine Learning (ICML-03), Aug. 21-24, 2003, Washington, DC, pp. 321-328.

Kingma et al., "Adam: A Method for Stochastic Optimization", arXiv:1412.6980v1. Dec. 22, 2014, 9 pages.

Kipf et al., "Semi-Supervised Classification with Graph Convolutional Networks", arXiv:1609.02907v3, Nov. 3, 2016, 13 pages.

Koutra et al., "DeltaCon: A Principled Massive-Graph Similarity Function", 2013 SIAM International Conference on Data Mining, (SDM13), May 2-4, 2013, Austin, TX, pp. 162-170.

Kriege et al., "On Valid Optimal Assignment Kernels and Applications to Graph Classification", Advances in Neural Information Processing Systems (NIPS 2016), Dec. 5-10, 2016, Barcelona, Spain, 9 pages.

Morris et al., "Weisfeiler and Leman Go Neural: High-order Graph Neural Networks", arXiv:1810.02244v2, Nov. 16, 2018, 16 pages.

Narayanan et al., "graph2vec: Learning Distributed Representations of Graphs", arXiv:1707.05005, Jul. 11, 2017, 8 pages.

Newman, "Finding community structure in networks using the eigenvectors of matices", arXiv:physics/0605087v3, Jul. 23, 2006, 22 pages.

Niepert et al., "Learning Convolutional Neural Networks for Graphs", International Conference on Machine Learning, Jun. 19-24, 2016, New York City, NY, 10 pages.

Papadimitriou et al., "Web Graph Similarity for Anomaly Detection", Journal of Internet Services and Applications, vol. 1, 2010, pp. 19-30.

Pedregosa et al., "Scikit-leam: Machine Learning in Python", Journal of Machine Learning Research, vol. 12, 2011, pp. 2825-2830.

Perozzi et al., "DeepWalk: Online Learning of Social Representations", $20^{th}$ ACM SIGKDD Conference on Knowledge Discovery and Data Mining, Aug. 24-27, 2014, New York City, NY, pp. 701-710.

Perozzi et al., "Don't Walk, Skip! Online Learning of Multi-scale Network Embeddings", arXiv:1605:02115v2, Jun. 24, 2017, 8 pages.

Shervashidze et al., "Weisfeiler-Lehman Graph Kernels", Journal of Machine Learning Research, vol. 12, 2011, pp. 2539-2561.

Taheri et al., "Learning Graph Representations with Recurrent Neural Network Autoencoders", KDD 2018 Deep Learning Day, Aug. 20, 2018, London, UK, 8 pages.

Tensorflow.Org, "TensorFlow: Large-Scale Machine Learning on Heterogeneous Distributed Systems", Nov. 9, 2015, https://www.tensorflow.org/extras/tensorflow-whitepaper2015.pdf, retrieved on Mar. 8, 2021, 19 pages.

Tixier et al., "Graph Classification with 2D Convolutional Neural Networks", arXiv:1708.02218v3, Feb. 12, 2018, 8 pages.

Toivonen et al., "Statistical evaluation of the Predictive Toxicology Challenge 2000-2001", Bioinformatics, vol. 19, No. 10, 2003, pp. 1183-1193.

Tsitsulin et al., "NetLSD: Hearing the Shape of a Graph", $24^{th}$ ACM SIGKDD Conference on Knowledge Discovery and Data Mining, Aug. 19-23, 2018, London, UK, pp. 2347-2356.

Tsitsulin et al., "VERSE: Versatile Graph Embeddings from Similarity Measures", arXiv:1803:04742v1, Mar. 13, 2018, 10 pages.

Vaswani et al., "Attention Is All You Need", $31^{st}$ Conference on Neural Information Systems (NIPS 2017), Dec. 4-9, 2017, Long Beach, CA, 11 pages.

(56) References Cited

OTHER PUBLICATIONS

Velickovic et al., "Graph Attention Networks", arXiv:1710.10903, Dec. 20, 2017, 12 pages.
Vishwanathan et al., "Fast Computation of Graph Kernels", Twenty-First Conference on Neural Information Processing Systems, Dec. 3-8, Vancouver and Whistler, BC, Canada, 8 pages.
Wale et al., "Comparison of Descriptor Spaces for Chemical Compound Retrieval and Classification", 2006 IEEE International Conference on Data Mining, Dec. 18-22, 2006, Hong Kong, China, 29 pages.
Wang et al., "Community Preserving Network Embedding", Thirty First AAAI Conference on Artificial Intelligence (AAAI-17), Feb. 4-9, 2017, San Francisco, CA, pp. 203-209.
Watts et al., "Collective dynamics of 'Small-world' networks", Nature, vol. 393, No. 4, Jun. 1998, pp. 440-442.
Wu et al,. "D2KE: From Distance to Kernel and Embedding", arXiv:1802.04956v4, May 25, 2018, 15 pages.
Xu et al., "Show, Attend and Tell: Neural Image Caption Generation with Visual Attention", International Conference on Machine Learning, Jul. 6-11, 2015, Lille, France, 10 pages.
Yanardag et al., "Deep Graph Kernels", $21^{st}$ ACM SIGKDD Conference on Knowledge Discovery and Data Mining, Aug. 10-13, 2015 Sydney, Australia, pp. 1365-1374.
Yang et al., "Hierarchical Attention Networks for Document Classification", $15^{th}$ Annual Conference of the North American Chapter of the Association for Computational Linguistics: Human Language Technologies (NAACL HLT 2016), Jun. 12-17, 2016, San Diego, CA10 pages.
Yin et al., "On the Dimensionality of Word Embedding", $32^{nd}$ Conference on Neural Information Processing Systems (NeurIPS 2018), Dec. 3-8, 2018, Montreal, Canada, 12 pages.
Ying et al., "Hierarchical Graph Representation Learning with Differentiable Pooling", arXiv:1806.08804v3, 12 pages.
Zachary et al., "An Information Flow Model for Conflict and Fission in Small Groups", Journal of Anthropological Research, vol. 33, No. 4, Winter 1977, pp. 452-473.
Zhang et al., "An End-to-End Deep Learning Architecture for Graph Classification", Thirty-Second Conference on Artificial Intelligence (AAAI-18), Feb. 2-7, 2018, New Orleans, LA, 8 pages.
Zheng et al., "From Node Embedding to Community Embedding", arXiv:1610.09950v1, Oct. 31, 2016, 7 pages.
Zhu et al., "Deep Variational Network Embedding in Wasserstein Space", $27^{th}$ ACM SIGKDD Conference on Knowledge Discovery and Data Mining, Aug. 19-23, 2018, London, England, pp. 2827-2836.

* cited by examiner

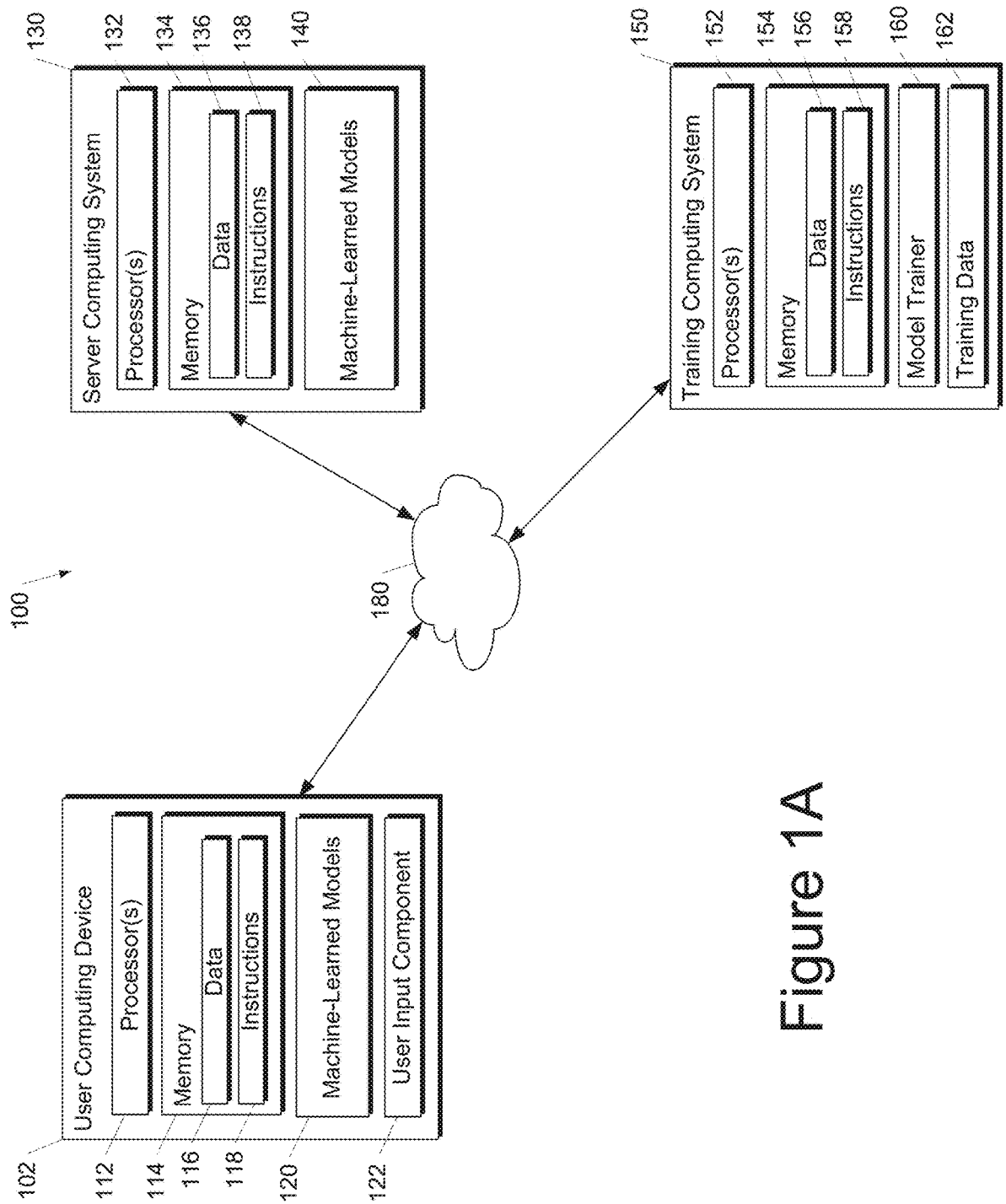

SYSTEMS AND METHODS FOR DETERMINING GRAPH SIMILARITY

CROSS REFERENCE TO RELATED APPLICATIONS

The present application claims priority to U.S. Provisional Application No. 62/835,899 having the filing date, Apr. 18, 2019, the entirety of which is incorporated herein by reference in its entirety.

FIELD

The present disclosure relates generally to machine learning methods for evaluating graph similarity. More particularly, the present disclosure relates to unsupervised learning techniques for evaluating graph similarity.

BACKGROUND

Machine Learning (ML) methods have achieved tremendous success in domains where the structure of the data is known a priori. For example, domains like speech and language have intrinsic sequential structure to exploit, while computer vision applications have spatial structure (e.g., images) and perhaps temporal structure (e.g., videos). In each of these cases, intuition can guide the building of models and learning algorithms based on the structure of the data. For example, translation invariant convolution networks might search for shapes regardless of their physical position in an image, or recurrent neural networks might share a common latent representation of a concept across distant time steps or diverse domains such as languages.

In contrast, graph learning represents a more general class of problems because the structure of the data is free from any constraints. An ML model (e.g., a neural network) must learn to solve both a desired task at hand (e.g., node classification) and to represent the structure of the problem itself—that of the graph's nodes, edges, attributes, and communities.

SUMMARY

The present application is directed to computing systems and computer-implemented methods for determining graph similarity. An aspect of the methods and computing systems disclosed herein is the ability to perform methods as unsupervised machine learning models. Another aspect of the disclosure is that, in addition to graph-to-graph (dis)similarity, a model output or result of the disclosed methods (e.g., graph embeddings) can be used as feature representations for predicting attributes of the graph as a whole (e.g., predicting hydrophobicity of molecule based on an embedding produced for a graph of the molecule). In this manner, though the systems and methods are unsupervised, their applications can be applied to generate high-level insights in wide array of technical fields.

An example embodiment of the disclosure includes a computer-implemented method for determining graph similarity. For embodiments of the disclosure, the computer-implemented method can include: obtaining, by one or more computing devices, a plurality of source graphs and a target graph; training, by the one or more computing devices, a source graph encoder for each source graph to generate a plurality of source graph encoders respectively associated with the plurality of source graphs, where the source graph encoder for each source graph is configured to predict one or more characteristics of the corresponding source graph based on an input that describes a portion of the corresponding source graph; training, by the one or more computing devices, a target graph encoder for each source graph to generate a plurality of target graph encoders respectively associated with the plurality of source graphs, where each target graph encoder is configured to predict one or more characteristics of the target graph based on an input that describes a portion of the target graph, and where the target graph encoder associated with each source graph comprises: an attention model configured to receive the input that describes the portion of the target graph and to convert the portion of the target graph into a portion of the corresponding source graph; the source graph encoder associated with the corresponding source graph; and a reverse attention model configured to receive and process an output of the corresponding source graph encoder to predict the one or more characteristics of the target graph; and generating, by the one or more computing devices, an embedding for the target graph, where the embedding comprises a plurality of performance values respectively for the plurality of target graph encoders.

In certain embodiments, the computer-implemented method can also include: performing, by the one or more computing devices for each of one or more additional target graphs, training of the target graph encoder for each source graph and generating of the embedding to generate one or more additional embeddings respectively for the one or more additional target graphs; and comparing, by the one or more computing devices, the embedding generated for the target graph with at least one of the additional embeddings associated with at least one of the additional target graphs to determine a similarity between the target graph and the at least one of the additional target graphs.

In any of the above embodiments, training the target graph encoder for each source graph can include iteratively updating, by the one or more computing devices, the target graph encoder for a number of rounds using an objective function, while keeping the source graph encoder fixed for each of the number of rounds.

In general, the target graph does not need to be a separate graph from the source graphs. Thus for embodiments of the disclosure, the target graph can include one of the plurality of source graphs. Additionally, embodiments of the disclosure are not limited to only using one target graph and any number of target graphs may be use in implementations of the disclosure.

In any of the above embodiments, the source graph encoder for each source graph can include a node-to-edges encoder configured to receive an input that identifies one or more nodes of the corresponding source graph and, in response, to predict each neighboring node that neighbors the one or more nodes of the corresponding source graph. Alternatively or in combination with the node-to-edges encoder, the source graph encoder for each source graph can include an edge-to-node encoder configured to receive an input that identifies one or more edges of the corresponding source graph and, in response, to predict a source and destination node for each of the one or more nodes of the corresponding source graph. Alternatively or in combination with the edge-to-node encoder, the source graph encoder for each source graph can include a neighborhood encoder configured to receive an input that identifies one or more nodes of the corresponding source graph and, in response, to predict a neighborhood of nodes or edges that surround each of the one or more nodes of the corresponding source graph, where the neighborhood of nodes or edges comprises nodes or edges discoverable through performance of a random walk process.

In any of the above embodiments, the one or more characteristics of the corresponding source graph predicted by the source graph encoder can include one or more attributes (e.g., a label) of one or more nodes or edges of the corresponding source graph, and training the source graph encoder for each source graph can include evaluating a loss function that compares the one or more attributes predicted by the source graph encoder for the one or more nodes or edges of the source graph to one or more ground truth attributes of the one or more nodes or edges of the source graph.

In any of the above embodiments, the source graph encoder can include a first neural network, the attention model can include a second neural network, and the reverse attention model can include a third neural network. Generally the order of the first neural network, the second neural network and the third neural network may be static or can be varied after or during training. In an example implementation, the second neural network can be positioned prior to the first neural network and the third neural network can be positioned subsequent to the first neural network. An aspect of the first, second, and third neural network can include a learning approach such as classification. In some embodiments, at least one (e.g., one or more) of the first, second, and their neural networks can include a multi-label classifier.

Another example embodiment of the disclosure includes a computing system configured to perform graph comparison, the computing system including: one or more processors; and one or more non-transitory computer-readable media that collectively store instructions that, when executed by the one or more processors cause the computing system to perform operations which include: training a source graph encoder using at least one source graph; training a target graph encoder, where training the target graph encoder includes: providing at least one characteristic of a target graph to an attention model to generate a source representation; determining an output by providing the source representation to the source graph encoder; providing the output to a reverse attention model to generate a prediction; and updating one or both of the attention model and the reverse attention model based in part on the prediction; and generating an embedding for the target graph, where the embedding comprises a performance value, and where the performance value is determined based in part on comparing the prediction to the target graph.

In general, aspects of example methods and embodiments disclosed herein may be implemented in computing systems to produce further embodiments of the disclosure. As an example, for certain embodiments that feature a computing system, the source graph encoder can include a neural network. As another example, for some embodiments that feature a computing system, the prediction can include a prediction of an attribute of the target graph, and, in some embodiments the attribute can include the at least one characteristic provided to the attention model. As a further example, for embodiments featuring a computing system, training the source graph encoder can include training at least one machine-learned multi-label classifier for each of the at least one source graphs to generate a plurality of machine-leaned multi-label classifiers, where each machine-learned multi-label classifier is associated with one source graph.

In certain implementations of the disclosure, updating one or both of the attention model and the reverse attention model based in part on the prediction can include: comparing the prediction to the target graph.

A further example embodiment of the disclosure includes a non-transitory computer-readable medium that stores instructions for determining graph similarity that, when executed by one or more computing devices, cause the one or more computing devices to perform operations. In an example implementation, the operations can include one or more of the embodiments disclosed herein. In another example implementation, the operations can include: obtaining a plurality of source graphs and a target graph; training a source graph encoder for each source graph to generate a plurality of source graph encoders each associated with a corresponding source graph, where the source graph encoder for each corresponding source graph predicts one or more characteristics of the corresponding source graph based on an input that describes a portion of the corresponding source graph; training a target graph encoder for at least one of the source graph encoders, where the target graph encoder is configured to predict one or more characteristics of the target graph based on an input that describes a portion of the target graph, and where training the target graph encoder includes: providing at least one characteristic of a target graph to an attention model to generate a source representation; determining an output by providing the source representation to at least one of the source graph encoders; providing the output to a reverse attention model to generate a prediction; and updating the attention model, the reverse attention model, or both based in part on the prediction; and generating an embedding for the target graph, where the embedding includes a plurality of performance values respectively for each target graph encoder.

In general, aspects of example methods, and embodiments disclosed herein may be contained on non-transitory computer-readable media to produce further embodiments of the disclosure. As an example, for certain embodiments that feature a non-transitory computer-readable medium that stores instructions for determining graph similarity, the operations can also include identifying a similar graph based at least in part on comparing the embedding for the target graph to one or more additional embeddings generated for one or more additional graphs.

In some implementations, whether embodied as a method, a computing system, or a non-transitory computer-readable medium, training the target graph encoder can include generating a plurality of target graph encoders, each of the target graph encoders associated with the source graph encoder used in determining the output while training the target graph encoder.

BRIEF DESCRIPTION OF THE DRAWINGS

Detailed discussion of embodiments directed to one of ordinary skill in the art is set forth in the specification, which refers to the appended figures, in which:

FIG. 1A depicts a block diagram of an example computing system according to example embodiments of the present disclosure.

Figure 1B:
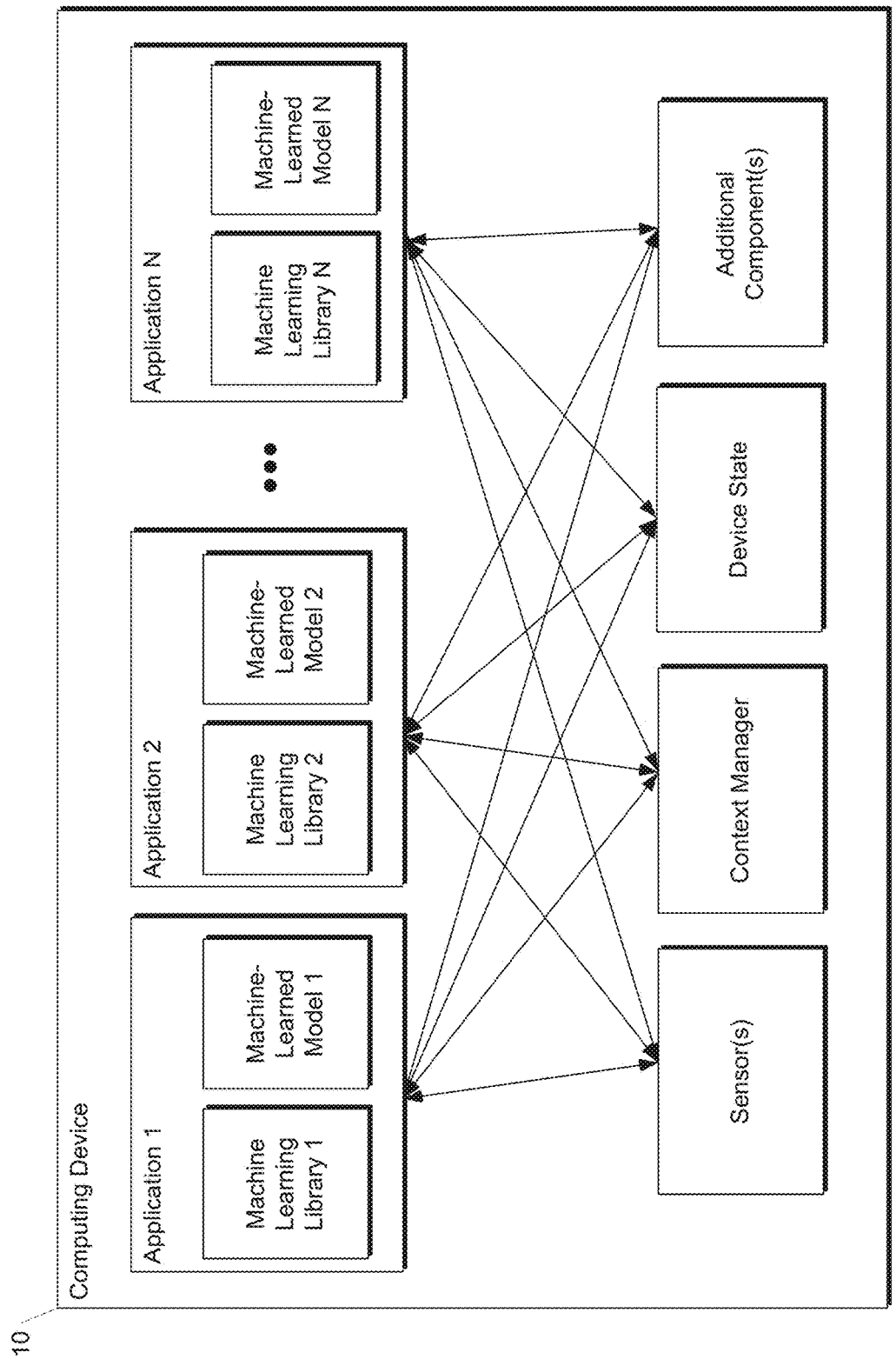
FIG. 1B depicts a block diagram of an example computing device according to example embodiments of the present disclosure.

Reference numerals that are repeated across plural figures are intended to identify the same features in various implementations.

DETAILED DESCRIPTION

The present disclosure provides computing systems and methods directed to algorithms and the underlying machine learning (ML) models for evaluating similarity between graph structures. The systems and methods disclosed may provide advantages or improvements for comparing graphs without additional context or input from a person (e.g., the methods are unsupervised). In particular, the systems and methods of the present disclosure can operate to generate respective embeddings for one or more target graphs, where the embedding for each target graph is indicative of a respective similarity of such target graph to each of a set of source graphs, and where a pair of embeddings for a pair of target graphs can be used to assess a similarity between the pair of target graphs.

More particularly, to address the challenge of comparing graph representations, a computing system can learn or otherwise generate a set of source graph encoders respectively for a set of source graphs. Each source graph encoder can be configured to predict one or more characteristics of the corresponding source graph based on an input that describes a portion of the corresponding source graph. However, although the predictions can be relative to certain portions of the graph, over a number of learning examples, the encoder can learn to encode the entirety of the corresponding source graph on which the source graph encoder was trained. Thereafter, the computing system can learn or otherwise generate a target graph encoder for each unique pair of target graph and source graph. Specifically, the target graph encoder for a given target graph and source graph can include an attention model followed by the corresponding source graph encoder for the source graph followed by a reverse attention model. The attention and reverse attention models of the target graph encoder can perform respective steps including: mapping an input descriptive of a portion of the target graph to a portion of the corresponding source graph, providing the mapping to the corresponding source graph encoder to generate an output, and reverse-mapping the output to one or more characteristics of the target graph. By optimizing the mapping and reverse-mapping functions, the methods can yield unsupervised machine learned models whose performance can be assessed to generate a representation of the corresponding target graph in an embedding space, which allows for the comparison of target graphs using a grouping, a distance function, or other suitable methods (e.g., a kernel can be created.) Specifically, an embedding can be generated for a particular target graph by measuring a performance parameter for each target graph encoder associated with such target graph. Embeddings generated for multiple target graphs in such manner can compared to assess similarity between the target graphs.

To provide an example for the purpose of illustration, a graph can be defined by a number of vertices connected by a set of edges. In some implementations the vertices and/or edges may also include an attribute which may be represented as a word (e.g., name, color, animal) or numerical value. For the use case of comparing a pair of graphs (source and target) the method can include learning the structure of the source graph by passing it through a source graph encoder. After learning the source graph structure, the source graph encoder can be used to measure how much the target graph diverges from the source by using the source graph encoder (e.g., as part of the larger target graph encoder model) to predict the structure of the target graph. If the pair are similar, the prediction should be close, even though the source graph encoder was not trained using the target graph. Using a population of source graphs, a prediction can be generated for the structure of the target graph relative to each source graph. This information can then be used to construct a target graph representation by determining how well the predicted structure compares to the target graph structure.

For implementations of the disclosure, the quality of the graph representation can depend on the extent to which the encoder of each source graph is able to discover its structure. As an example, several choices for encoding graphs can include: predicting the neighbors of a single node, predicting the source and destination nodes of a single edge, and/or predicting a set of nodes and/or edges that are beyond immediate neighbors. In certain implementations more than one method of encoding graphs can be applied to learn the structure of a graph. Each of these methods for encoding the source graphs may include a different objective function to be optimized during training. Additionally, for predicting the set of nodes and/or edges that are beyond immediate neighbors, a mechanism such as a random walk method can be used to determine a neighborhood around a specific node or edge. Given a partial random walk, an example encoder can predict the vertices that could have been visited within a specific number of hops.

In addition to learning the structure of a source graph, implementations of the disclosure can also include a target graph encoder including an attention network and a reverse attention network. The attention network can be configured to map the nodes or edges of the target graph so that these characteristics can be provided as an input to the source graph encoder. The reverse attention network can be configured to learn how to map a neighborhood in the source graph to a neighborhood in the target graph (or other mappings of encoder outputs). By adding both attention networks to the source graph encoder, embodiments of the disclosure can produce a target graph encoder that can predict the target graph structure, but with respect to the structure of the source graph.

Generally any number of target graphs can be used in implementations of the disclosure, and for certain implementations the one or more target graphs can be included in the plurality of source graphs. Thus, the differentiation between a target graph and a source graph is used mainly for illustration and need not define two separate sets of graphs. For example, considering a group of 10 source graphs, where each source graph is also a target graph, a source graph encoder can be trained for each of the 10 source graphs to produce 10 source graph encoders, each configured to predict one or more characteristics of the corresponding source graph used to train the source graph encoder. A set of target graph encoders can then be trained by applying each of the 10 source graph encoders to each target graph (in this example 10) which would produce 100 target graph encoders total, where 10 of the target graph encoders are associated with each target graph. An embedding can be generated for each target graph by measuring the performance of the 10 respective target graph encoders that are associated with such target graph. The numbers given in the example above are provided as examples only for the purpose of illustration. Other numbers, correlations, and schemes may be used as well.

In some implementations, the graphs can include an attribute such as a label for certain nodes and edges. For these implementations the attention network can assign each node in the target graph a probability distribution over the nodes of the source graph. Though there may be several, equally good, nodes in the source graph with similar structural features, these nodes may differ in their attributes. To learn an alignment that preserves nodes and edges attributes, a loss function can be added to one or both the attention and reverse-attention network. In an example implementation, the one or more characteristics of the target graph predicted by each target graph encoder may include one or more attributes of one or more nodes or edges of the target graph, and training the target graph encoder for each source graph can also include evaluating a loss function that compares the one or more attributes predicted by each target graph encoder for the one or more nodes or edges of the target graph to one or more ground truth attributes of the one or more nodes or edges of the target graph.

In certain implementations, generating the embedding may include determining a vector space based on output of the target graph encoders. Since a target graph encoder can be produced for each source graph encoder, the vector space may be constructed such that each dimension corresponds to one graph in the source set and target graphs represent points in this vector space. In an example implementation, the vector space can include a performance score based on the divergence between the source and target graph, such that if the graphs are similar, the divergence is low.

Generally training the source graph encoder and the target graph encoder can include training one or more ML models. In an example implementation, the one or more ML models can include one or more connected neural networks. For example, the source graph encoder can include a first neural network, the attention model can include a second neural network positioned prior to the first neural network in the target graph encoder, and the reverse attention model can include a third neural network positioned subsequent to the first neural network in the target graph encoder. Since graph representations may not exactly match and predictions can include multiple results (e.g., the predictions do not need to be mutually exclusive), in an implementation of the disclosure one or more of the first, second, or third neural networks can include a multi-label classifier.

Using the framework developed herein, several alternatives may be developed without departing from the spirit of the disclosure. For example, rather than training a source graph encoder for each source graph, a subset of source graphs may be selected based on computational resources. Additionally, for certain implementations, the methods disclosed may be included as computer-readable media that collectively store instructions that, when executed by one or more processors cause the computing system to perform operations including training a source graph encoder, training a target graph encoder, and generating an embedding.

In particular, Appendix A, which is included as a portion of this disclosure, demonstrates through studies on graph datasets that example implementations of the proposed algorithms can perform on par or better when compared to algorithms that include some level of supervision or feature engineering (e.g., graph motifs, random walks, etc.) Appendix A includes Table 3: which shows the average accuracy in a cross validation comparing the performance of 9 other methods to an example implementation of the disclosure (e.g., DDGK.)

The examples and implementations disclosed herein can provide improved technical effects and benefits for learning representations of graphs in an embedding space. As an example, graph structures across varying domains (e.g., biology, chemistry, social networks, transportation networks, etc.) can be represented without requiring explicit feature engineering. Additionally, since the methods are unsupervised, an expert would not be required to label data or model output to determine performance which can lead to decreased costs.

2. Example Graph Definition

An example method for representing a graph structure can include defining one or more graph characteristics as a tuple (e.g., $G=(V, E)$), where V is the set of nodes and E is the set of edges, $E \subseteq (V \times V)$. A graph G can in some instances have an attribute vector Y for each of its nodes or edges. The attributes of a node $v_i$ can be denoted as $y_i$, and the attributes of an edge $(v_i, v_j)$ can be denoted as $y_{ij}$.

Given a family of graphs $G_0, G_1, \ldots, G_N$ the disclosed methods and systems can generate a representation (e.g., a continuous representation) for each graph $\Psi(G) \in \mathbb{R}^N$ that can encode its attributes and its structure. To improve the utility of the representation, it can be comparable to other graph representations to measure similarity between graphs.

An example aspect of this disclosure is the ability to develop an equivalence class across all possible encodings of a graph. In an implementation, two encodings of a graph can be equivalent if they produce substantially the same pair-wise similarity scores when used to compare the graph to all other graphs in the set. This issue can arise when working with embedding based representations across domains.

Aspects of the present disclosure are directed to the development of graph kernels, which can act as functions to compute the pairwise similarity between graphs. Specifically, given two graphs $G_1, G_2$, a classic example of a kernel defined over graph pairs is the geometric random walk kernel as shown in Eq. 1:

$$k_x(G_1,G_2)=e^T(I-\lambda A_x)^{-1}e, \quad \text{Eq. 1}$$

where $A_x$ is the adjacency matrix of the product graph of $G_1$ and $G_2$, and $\lambda$ is a hyper-parameter which encodes the importance of each step in the random walk. Embodiments of the disclosure can be used to learn an embedding based kernel function k( ) as a similarity metric for graph pairs that in some implementations can be defined as shown in Eq. 2:

$$k(G_1,G_2)=\|\Psi(G_1)-\Psi(G_2)\|^2 \quad \text{Eq. 2}$$

As one example, for a dataset of N source graphs $\mathcal{S}$ and M target graphs ($\mathcal{T}$), for any member of the target graph set the $i^{th}$ dimension of the representation $\Psi(G \in \mathcal{T}) \in \mathbb{R}^N$ can be defined as shown in Eq. 3:

$$\Psi(G)_i = \Sigma_{v_j \in V} f_{g_i}(v_j), \quad \text{Eq. 3}$$

where $g_i \in \mathcal{S}$ and $f_{g_i}( )$ is a predictor of some structural property of the graph G but parameterized by the graph $g_i$.

For these implementations, it should be noted that the source and target graphs sets ($S, T$) could be disjoint, overlapping, or equal.

3. Aligning Graph Representations

An example aspect of the present disclosure includes learning a graph representation by comparing one or more graphs (e.g., target graphs) to a population of graphs (e.g., source graphs). To compare the similarity of a pair of graphs (source, target), one or more machine learning models (e.g., neural networks) can be trained to measure the divergence between their structure and attributes. As an example, the structure of the source graph can be learned by passing it through a source graph encoder such as a deep neural network that can, for example, be configured as a multi-label classifier. In certain implementations, to measure how much the target graph diverges from the source graph, the source graph encoder can be used to predict the structure of the target graph. If the pair is similar, generally the source graph encoder should predict the target graph's structure (e.g., the nodes and edges) more correctly or with a greater accuracy compared to if the pair were different. In this section, several aspects of embodiments for determining the similarity between a pair of graphs are reviewed.

To learn the structure of a graph, an encoder capable of reconstructing such structure can be trained given partial or distorted information. As a non-limiting example, a node-to-edges encoder may be used. Generally, the node-to-edges encoder can be configured to predict the neighbors of a node provided to the encoder. In an example implementation, this can be modeled as a multilabel classification task since the predictions may not be mutually exclusive. For training the encoder an objective function comparing the prediction to the actual node or nodes may be used, an example objective function is shown in Eq. 4A, and training can include maximizing or otherwise optimizing the objective function $J(\theta)$, $$J(\theta) = \sum_i \sum_{e_{ij} \in E} j \log Pr(v_j | v_i, \theta). \quad \text{Eq. 4A}$$

In some implementations each node $v_i$ in the graph can be represented by one-hot encoding vector $\vec{v}_i$. To embed the node its encoding vector can be multiplied with a linear layer $E \in \mathbb{R}^{|V| \times d}$ resulting in an embedded node $e_{v_i} \in \mathbb{R}^d$, where $|V|$ represents the number of nodes in the graph, and $d$ represents the size of the embedding space.

For graphs that include a large number of nodes, in certain implementation this multiplication can be substituted with a table lookup, extracting one row from the embedding matrix. This embedding vector represents the feature set given to the encoder tasked with predicting all adjacent nodes. In some implementations, the encoder H, can include a neural network (e.g., a fully connected deep neural network or DNN) with an output layer of size $|V|$ and trained as a multilabel classifier.

As another example, in addition or alternatively to a node-to-edges encoder, an edge-to-nodes encoder can be used. The edge-to-nodes encoder can be trained to predict the source and destination vertices given a specific edge as input. Similar to the node-to-edges encoder, this could be expressed as a multilabel classification task with the following objective function:

$$J(\theta) = \Sigma_{e_{ij} \in E} \log Pr(v_i | e_{ij}, \theta) + \log Pr(v_j | e_{ij}, \theta) \quad \text{Eq. 4B}$$

Note that the number of edges in a graph could grow quadratically, therefore, iterating over the edges is more expensive than the nodes.

As yet another example, in addition or alternatively to the encoders described above, a neighborhood encoder can be used. A neighborhood encoder can be trained to predict a set of vertices or edges that are beyond the immediate neighbors. For example, random walks could serve as a mechanism to calculate a neighborhood around a specific node or edge. Given a partial random walk, the encoder has to predict the vertices that could have been visited within a specific number of hops:

$$J(\theta) = \sum_{\sim RandomWalk(G,E,V)} (v_1, v_2, \ldots, v_i) \log Pr(v_j | (v_1, v_2, \ldots, v_i, \theta)) \quad \text{Eq. 4C}$$

Another example aspect of the present disclosure includes the ability to align graphs that may differ in size (differing node sets) and structure (differing edge sets). To achieve learning an alignment between the graphs an attention mechanism is proposed. In certain embodiments, the attention mechanism can operate in the absence of a direct mapping between nodes. As an example implementation, an attention mechanism termed isomorphism attention that aligns the nodes of a target graph against those of a source graph can be used and is further described in section 4.

4. Isomorphism Attention

Given two graphs, S (source graph) and T (target graph), an example model can include bi-directional mapping across the pair's nodes. In an example implementation, this can be accomplished using two separate attention networks. The first network (which can be referred to as an "attention model") can allow nodes in the target graph to attend to the nodes in the source graph. The second network (which can be referred to as a "reverse attention model"), can allow neighborhood representations in the source graph to attend to neighborhoods in the target graph.

As an example, the first attention network can be denoted as ($\mathcal{M}_{T \to S}$) and can be configured to assign every node in the target graph ($u_i \in T$) a probability distribution over the nodes of the source graph ($v_j \in S$). This first attention network can be configured to pass the nodes of the target graph as an input to the source graph encoder. In an example implementation, this first attention network can include a multiclass classifier. An example equation for assigning a source node ($v_j$) given a target node ($u_i$) is shown in Eq. 5:

$$Pr(v_j | u_i) = \frac{e^{\mathcal{M}_{T \to S}(v_j, u_i)}}{\Sigma_{v_k \in V_S} e^{\mathcal{M}_{T \to S}(v_k, u_i)}}. \quad \text{Eq. 5}$$

The second network is a reverse attention network ($\mathcal{M} S \to T$) which aims to learn how to map a neighborhood's representation in the source graph to a neighborhood in the target graph. By adding both attention networks to the source graph encoder, an example target graph encode can be developed that can be able to predict the neighbors of each node in a target graph—but utilizing the structure of the source graph. In an example implementation, the reverse attention network can include a multilabel classifier. An example equation for mapping a target node ($u_i$) given a source neighborhood ($\mathcal{N}(v_i)$) is shown in Eq. 6:

$$Pr(u_j | \mathcal{N}(v_i)) = \frac{1}{1 + e^{-\mathcal{M}_{S \to T}(u_j, \mathcal{N}(v_i))}}. \quad \text{Eq. 6}$$

As an example implementation, the attention network ($\mathcal{M}_{T \to S}$) can receive a one-hot encoding vector representing a node ($u_i$) in the target graph and mapping it onto the most structurally similar node ($v_j$) from the source graph. The source graph encoder can then predict the neighbors of $v_j$, $\mathcal{N}(v_j)$. The reverse attention network ($\mathcal{M}_{S \to T}$), can then take $\mathcal{N}(v_j)$ and maps them to the neighbors of $u_i$, $\mathcal{N}(u_i)$.

In certain embodiments, both attention networks may be implemented as linear transformations $W_A \in \mathbb{R}^{|V_Q| \times |V_P|}$. In some scenarios where $|V_P|$ and/or $|V_Q|$ are prohibitively large, the attention network parameters can be decreased (e.g., by substituting a DNN with hidden layers of fixed size.) Implementing a fixed size in these scenarios can reduce processing time and computational resources by modifying the attention network size from $\Theta(|V_P| \times |V_Q|)$ to $\Theta(|VP| + |V_Q|)$.

In some implementations, to learn the augmented target graph encoder which consists of the source graph encoder with these additional attention layers; a computing system can: first, freeze the parameters of the source graph encoder; and second, train the augmented encoder on batches of the target graphs nodes and their neighbors. Here, the augmented encoder has to predict the neighboring vertices for each vertex in the target graph with the help of the attention and reverse-attention layers. Finally, once the training of the attention layers is done, the augmented encoder can be used to compute the divergence between the graph pair as discussed elsewhere herein such as section 6.

5. Attributes Consistency

Labeled graphs may not only be defined by their structures but can also include attributes assigned to their nodes and edges. In example embodiments, the attention network assigns each node in the target graph a probability distribution over the nodes of the source graph. In some cases there can be several, equally good, nodes in the source graph with similar structural features. However, these nodes may differ in their attributes. To learn an alignment that preserves nodes and edges attributes, regularizing losses can be added to the attention and/or the reverse-attention networks.

As an example, referring to the nodes as v and u for the source and target graphs, respectively. A set of attributes as $\mathcal{Y}$ and the distribution of attributes over the graph nodes can be defined as ($Q_n = Pr(y_i | u)$). Given that the attention network $\mathcal{M}_{T \to S}$ can be configured to learn the distribution $Pr(u_k | v_j)$, an additional probability distribution can be determined over the attributes as inferred by the attention process. An example equation for predicting a source attribute ($y_i$) given a target node a target node ($u_i$) is shown in Eq. 7:

$$Q_n(y_i | u_j) = \Sigma_k \mathcal{M}_{T \to S}(y_i | v_k) Pr(v_k | u_j). \quad \text{Eq. 7}$$

In an implementation, the attention regularizing loss over the attributes of the nodes can be defined as the average cross entropy loss between the observed distribution of attributes and the inferred as shown in Eq. 8.

$$L = \frac{1}{|V_T|} \sum_j^{|V_T|} \sum_i Pr(y_i | u_j) \log (Q_n(y_i | u_j)), \quad \text{Eq. 8}$$

where $|V_T|$ is the number of nodes in the target graph.

In some embodiments, it may be desirable to preserve edge attributes over nodes. For these embodiments, a function can be defined as $Q_e(y_i | u) = Pr(y_i | u)$ to represent the normalized attributes count over all edges connected to the node u. For instance, if a node u has 5 edges with 2 of them colored red and the other three colored yellow, $Q_e(red | u) = 0.4$ By replacing $Q_n$ with $Q_e$ in Equations 7 and 8, a regularization loss for edge attributes can be included in certain implementations.

For certain embodiments, these regularization losses can also be implemented in reverse attention networks. In certain implementations, the reverse attention networks can function to map a neighborhood in the source graph to a neighborhood in the target graph. As an example, the distribution of attributes over a node's neighborhood can be the frequency of each attribute occurrence in the neighborhood normalized by the number of attributes appearing in the neighborhood. For edges, the node's neighborhood edges can be the edges appearing at 2-hops (or greater) distance from the node. In an example implementation, the probability of the attributes of the edges can be defined by normalizing their frequencies over the total number of attributes of edges connected to the neighborhood.

6. Graph Divergence

In Sections 3-5 example methods are described for learning representations of graphs, and attention mechanisms for aligning graphs based on a set of encoded graph representations. In this section, an example method is developed that uses the alignment to construct a graph kernel based on divergence scores. In this Section, example metrics for calculating divergence scores are provided that can be used to construct a full graph representation. In certain implementations, divergence may be driven by the target graph structure and attribute prediction error as calculated using a source graph encoder. In the following section, an example method for learning graph representations termed Deep Divergence Graph Kernels (DDGK) is reviewed. Following in Section 8, example training methods for generating these representations are reviewed.

In this section, the ability of the augmented encoder to predict the structure of the target graph is reviewed as an example method for measuring the similarity between the graphs. By way of example, assume the case where both the source and target graphs are identical. First, the source graph encode can be trained. Second, a target graph encoder (e.g., an augmented encoder including attention networks) can be trained to predict the structure of the target graph. The attention networks will (ideally) learn the identity function. Therefore, the source graph encoder should encode the target graph as accurately as encoding itself. In this instance, the method should conclude that these graphs are similar or ideally identical.

An additional aspect of certain implementations is to learn a metric that measures the divergence score between a pair of graphs {S, T}. If two graphs are similar, we expect their divergence to be correspondingly low. Herein, reference to the encoder trained on a graph S is $H_S$ and the divergence score given to the target graph T can be measured using Eq. 9:

$$\mathcal{D}'(T \| S) = \sum_{v_i \in V_T} \sum_{e_{ji} \in E_T} -\log Pr(v_j | v_i, H_S) \quad \text{Eq. 9}$$

Since $H_S$ may not be a perfect predictor of the graph S structure, it can be assumed that $\mathcal{D}'S\|S \neq 0$. To account for this, a correction can be applied in some implementations, an example equation for determining the corrected divergence score is shown in Eq. 10:

$$\mathcal{D}(S\|T) = \mathcal{D}'(S\|T) - \mathcal{D}'(S\|S), \quad \text{Eq. 10}$$

which may set $\mathcal{D}(S\|S)$ to zero.

In some cases, this definition may not be symmetric (as $\mathcal{D}(T\|S)$ might not necessarily equal to $\mathcal{D}(S\|T)$). If symmetry is required, another calculation can be implemented as, $\mathcal{D}(S,T) = \mathcal{D}(S\|T) + \mathcal{D}(T\|S)$.

7. Graph Embedding

Given a set of source graphs and using the examples disclosed herein, a vector space can be generated where each dimension corresponds to one graph in the source set. In an implementation, target graphs can be represented as points in this vector space where the value of the $i_{th}$ dimension for a given target graph $T_j$ is $\mathcal{D}D(T_j\|S_i)$.

More formally, for a set of N source graphs we can define the target graph representation as the matrix shown in Eq. 11:

$$\Psi(G_T) = [\mathcal{D}(T\|S_0), \mathcal{D}(T\|S_1), \ldots, \mathcal{D}(T\|S_N)] \quad \text{Eq. 11}$$

In an example implementation, a kernel can be created from the graph embeddings, using a distance measure such as the Euclidean distance measure outlined in Eq 2. Different distance measure may provide unique advantages. For example, this distance measure can guarantee a positive definite kernel.

8. Example Algorithm

An example implementation of this disclosure is provided below as Algorithm I, which includes pseudo code providing an embodiment referred to as deep divergence graph kernels (DDGK.) Algorithm I includes two parts. A node-to-edges encoder that can be trained for all source graphs (Algorithm I, lines 8-15). Additionally, cross-graph attentions can be learned for all target-source graph pairs (Algorithm I, lines 20-25). As an example, DDGK can be implemented using a deep neural network for the source graph encoder (e.g., a node-to-edges encoder) and linear transformations can be used to implement isomorphism attention.

Algorithm I:

1. Input: Set of N source graphs $\mathcal{S}$
2.    Set of M target graphs $\mathcal{T}$
3.    Learning rate $\alpha$
4.    Encoding epochs $\tau$
5.    Scoring epochs $\rho$
6. Output: All graph representations $\Psi \in \mathbb{R}^{M \times N}$
7. // learn graph encodings
8. foreach $g_i \in \mathcal{S}$ do
9.   V, E $\leftarrow g_i$
10.   for step $\leftarrow$ 0 to $\tau$ do
11. $$J(\theta) = -\Sigma_s \Sigma_{e_{st} \in E} \log \Pr(v_t|v_s, \theta)$$
12. $$\theta = \theta - \alpha * \frac{\partial J}{\partial \theta}$$
13.   end
14.   encodings[i] $\leftarrow \theta$
15. end
16. foreach $g_i \in \mathcal{T}$ do
17.   V, E $\leftarrow g_i$
18.   foreach $\theta_j \in$ E encodings do
19.   // learn cross-graph attention $\mathcal{M}_{T \to S}$ and $\mathcal{M}_{S \to T}$
20.     for step $\leftarrow$ 0 to $\rho$ do
21./22. $$J(\mathcal{M}_{T \to S}, \mathcal{M}_{S \to T}) = -\Sigma_s \Sigma_{e_{st} \in E} \log \Pr(v_t|v_s, \theta_j, \mathcal{M}_{T \to S}, \mathcal{M}_{S \to T})$$
23. $$\mathcal{M}_{T \to S} = \mathcal{M}_{T \to S} - \alpha * \frac{\partial J}{\partial \mathcal{M}_{T \to S}}$$
24. $$\mathcal{M}_{S \to T} = \mathcal{M}_{S \to T} - \alpha * \frac{\partial J}{\partial \mathcal{M}_{S \to T}}$$
25.     end
26.     // calculate graph divergences
27.     $\Psi[i, j] \leftarrow J(\mathcal{M}_{T \to S}, \mathcal{M}_{S \to T})$
28.   end
29. end
30. return $\Psi$

9. Example Training Techniques

Without limiting the methods for training machine learning models, examples methods are disclosed to describe how Algorithm I and/or other aspects of the present disclosure can be implemented. As an example implementation, training can be accomplished using a program (e.g., TensorFlow) to optimize an objective function over a number of training iterations such as by calculating gradients with backpropagation, and updating model parameters using Adam. In some implementations, each source graph can be trained on its adjacency matrix for a constant number of iterations.

As an example implementation for training the target graph encoder, which includes the source graph encoder augmented with the additional attention layers, an example procedure can include: freezing the parameters of the source graph encoder, adding two additional networks (one for attention and another for reverse attention mapping between the target graph nodes to the source graph nodes and vice versa), optionally, adding the regularizing losses to preserve the nodes or edges attributes if available, and training the augmented encoder on the input, which can include: the adjacency matrix of the target graph, a node attribute and/or edge attribute matrix (if available.) Once training of the attention layers is done, the augmented encoder can be used to compute the divergence between the graph pair as discussed in Section 7.

10. Example Devices and Systems

With reference now to the Figures, example embodiments of the present disclosure will be discussed in further detail.

FIG. 1A depicts a block diagram of an example computing system 100 that can perform operations for evaluating graph similarity using one or more machine-learned models (e.g., a source graph encoder and/or a target graph encoder) according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models such as a source graph encoder, a target graph encoder or components of one or both of these encoders (e.g., the attention model, the reverse attention model or both.) For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIGS. 3-5.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel training of the source encoders or graph encoders across multiple instances of algorithms for determining graph similarity (e.g., across multiple instances of DDGK)).

More particularly, implementations of the machine-learned models 140 can be used to generate an embedding space for one or more target graphs that can be used to represent the similarity between the graphs as a quantitative value (e.g., a performance value).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140 including overall models incorporating a connected structure between the one or more machine-learned models. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, a set of source graphs, the graphs including one or more nodes and/or one or more edges. In some implementations, the training data 162 can also include attribute data characterizing the nodes and or edges. As an example, the attribute data can include a label further characterizing the node or edge such as a color (e.g., red, blue, etc.), an element (e.g., hydrogen, carbon, oxygen), or other suitable labels.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a graph similarity application, a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
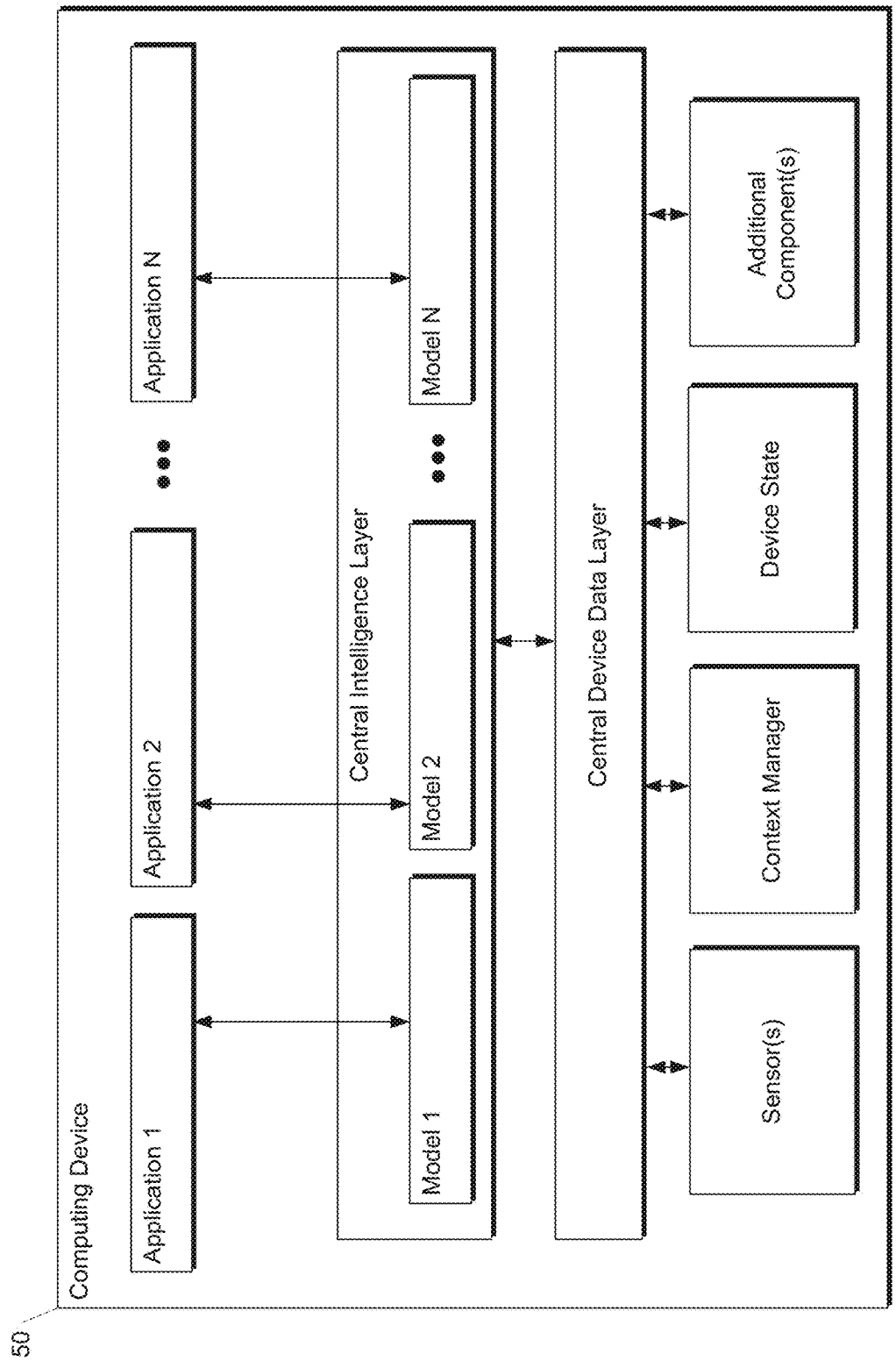
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a graph similarity application, a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 4:
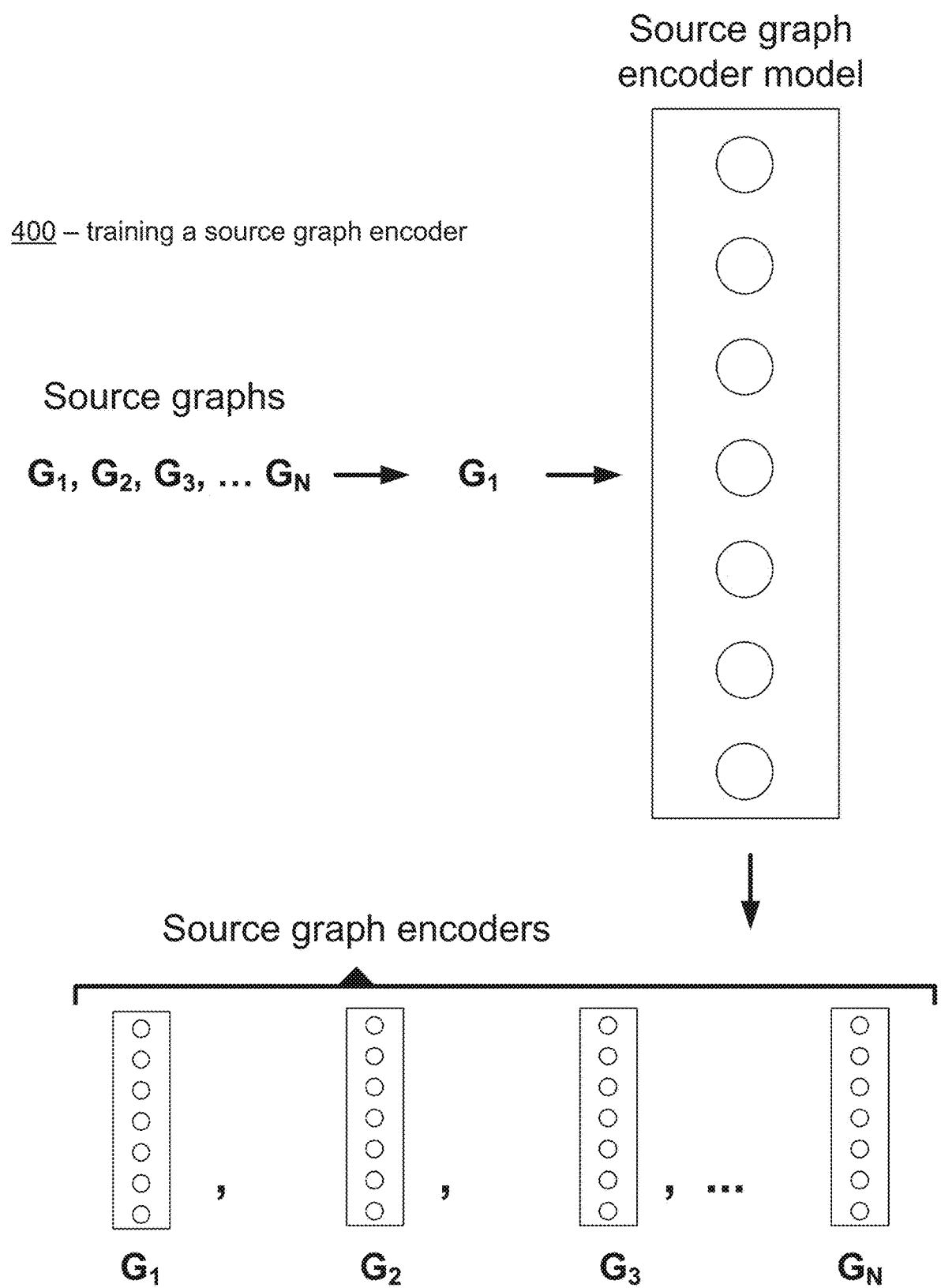
FIG. 4 depicts an example process for training a source graph encoder for each source graph using a source graph encoder model such as a machine learning model according to example embodiments of the present disclosure.

FIG. 4 depicts a diagram for training a source graph encoder 400 according to example embodiments of the present disclosure. In some implementations, the machine learned model can be trained using input data (e.g., a set of source graphs) which includes description of nodes, edges, and or attributes. As a result of receipt of the input data, a source graph encoder model (e.g., a neural network) can be trained from each graph from the set of source graphs to generate a set of source graph encoders, each associated with a corresponding source graph (e.g., $G_1$, $G_2$, $G_3$, etc.).

Figure 5:
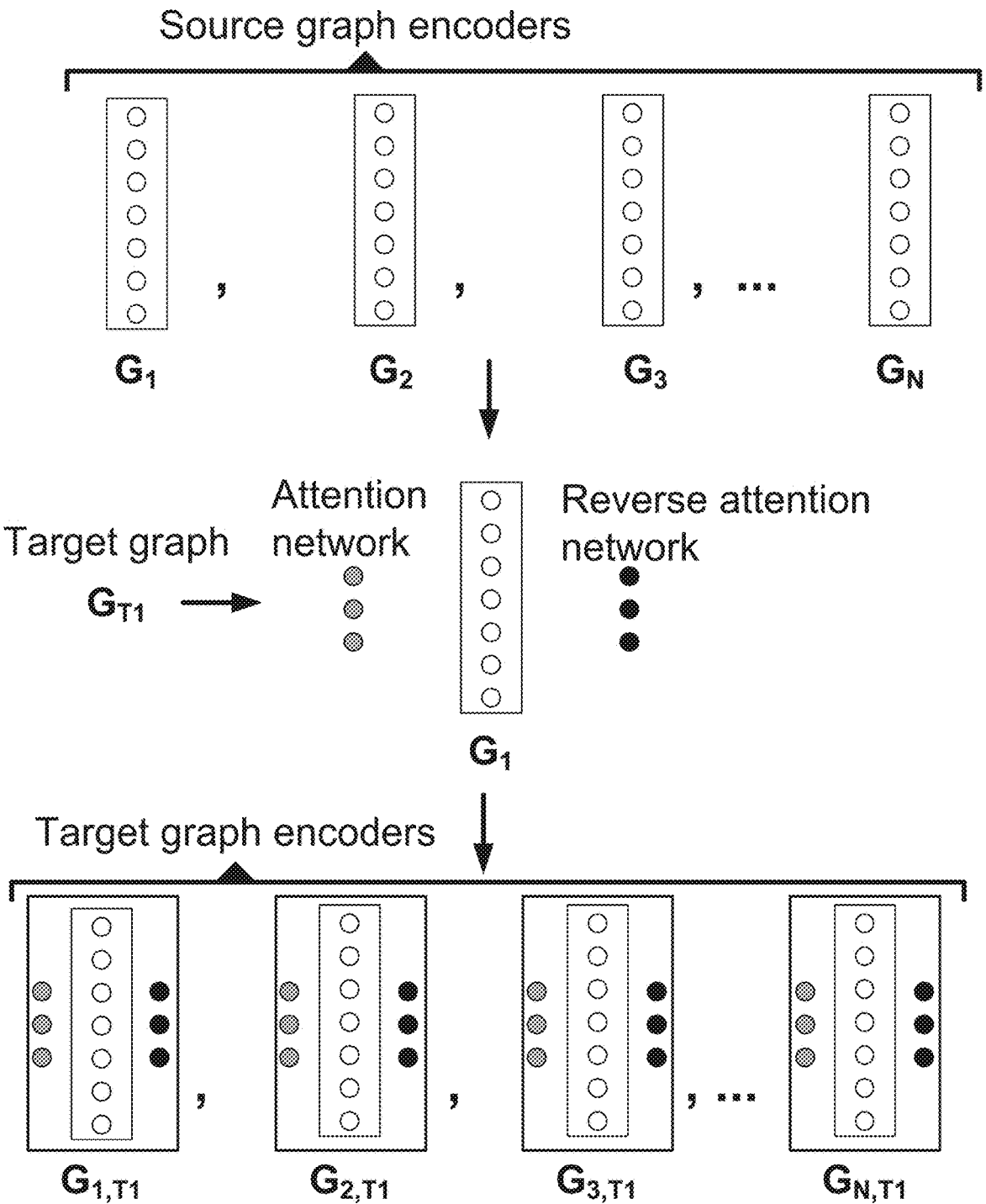
FIG. 5 depicts an example process for training target graph encoders by providing a target graph to an attention network prior to a source graph encoder and a reverse attention network. This process can be repeated for each source graph encoder according to example embodiments of the present disclosure.

FIG. 5 depicts a diagram for training a target graph encoder 500 according to example embodiments of the present disclosure. In certain implementations, the machine learned model can be trained using input data (e.g., one or more target graphs) which includes description of nodes, edges, and or attributes. In addition to the input data, the set of source graph encoders is used to produce an augmented encoder including an attention network and a reverse attention network. In this manner, as a result of receipt of the input data, a target graph encoder (e.g., a neural network) can be trained for each source graph encoder, to generate a set of target graph encoders, each associated with a corresponding source graph and target graph (e.g., $G_{1,T1}$, $G_{2,T1}$, $G_{3,T1}$, etc.).

Example Methods

Figure 2:
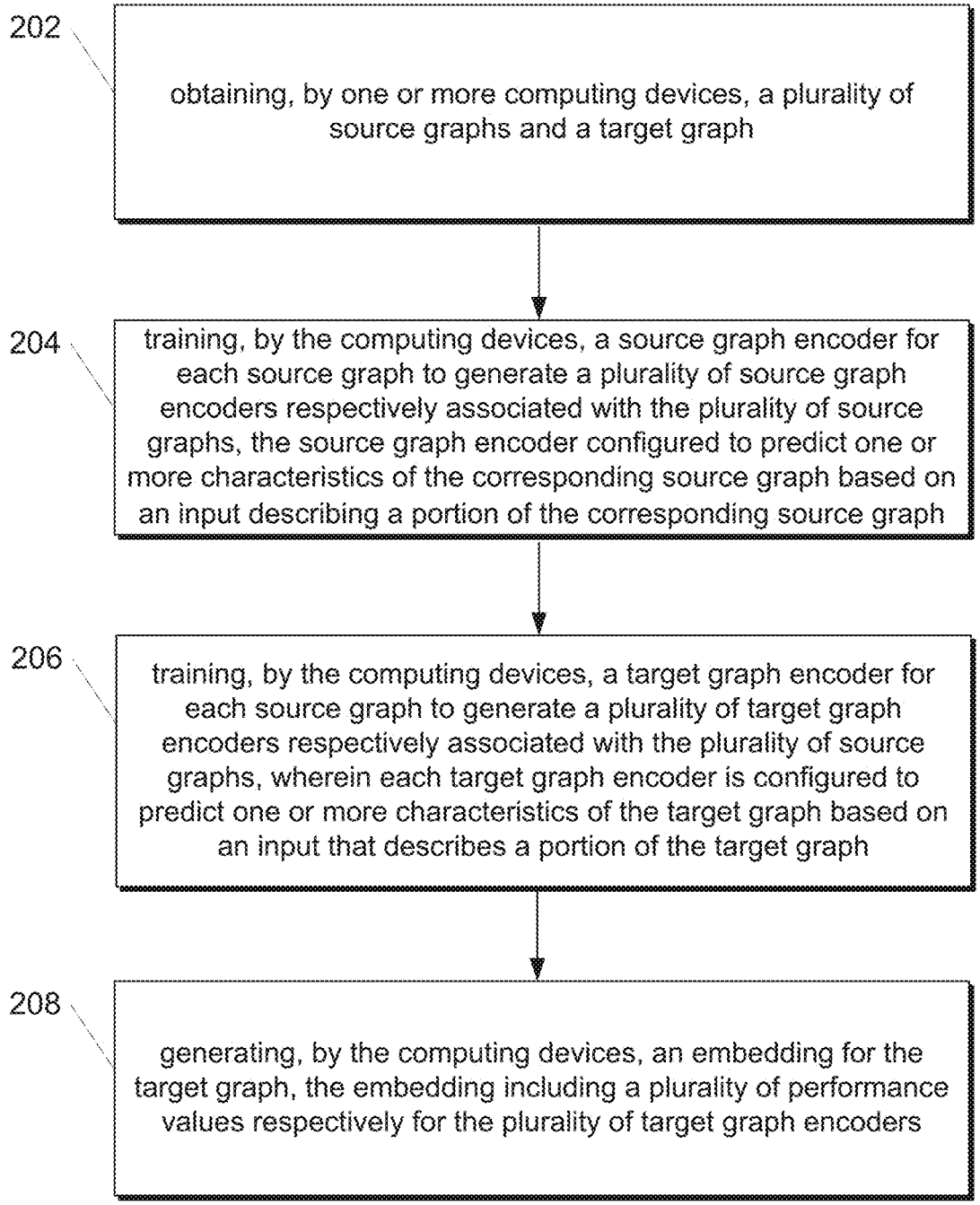
FIG. 2 depicts a flow chart diagram of an example method to perform determining graph similarity according to example embodiments of the present disclosure.

FIG. 2 depicts a flow chart diagram of an example method for determining graph similarity according to example embodiments of the present disclosure. Although FIG. 2 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

At 202, a computing system obtains a plurality of source graphs and a target graph.

At 204, the computing system trains a source graph encoder for each source graph to generate a plurality of source graph encoders respectively associated with the plurality of source graphs, the source graph encoder configured to predict one or more characteristics (e.g., the graph structure including each node and/or each edge) of the corresponding source graph based on an input describing a portion of the corresponding source graph.

At 206, the computing system trains a target graph encoder for each source graph to generate a plurality of target graph encoders respectively associated with the plurality of source graphs, and where each target graph encoder is configured to predict one or more characteristics of the target graph based on an input that describes a portion of the target graph.

At 208, the computing system generates an embedding for the target graph, the embedding including a plurality of performance values respectively for the plurality of target graph encoders.

When applying method 200 to applications having multiple target graphs, at 206, the computing system trains for each target graph a target graph encoder for each source graph to generate a plurality of target graph encoders respectively associated with the plurality of source graphs. For example, given an input of 3 source graphs and 2 target graphs, a total of 3 source graph encoders and 6 target graph encoders can be generated as a result of method 200.

Figure 3:
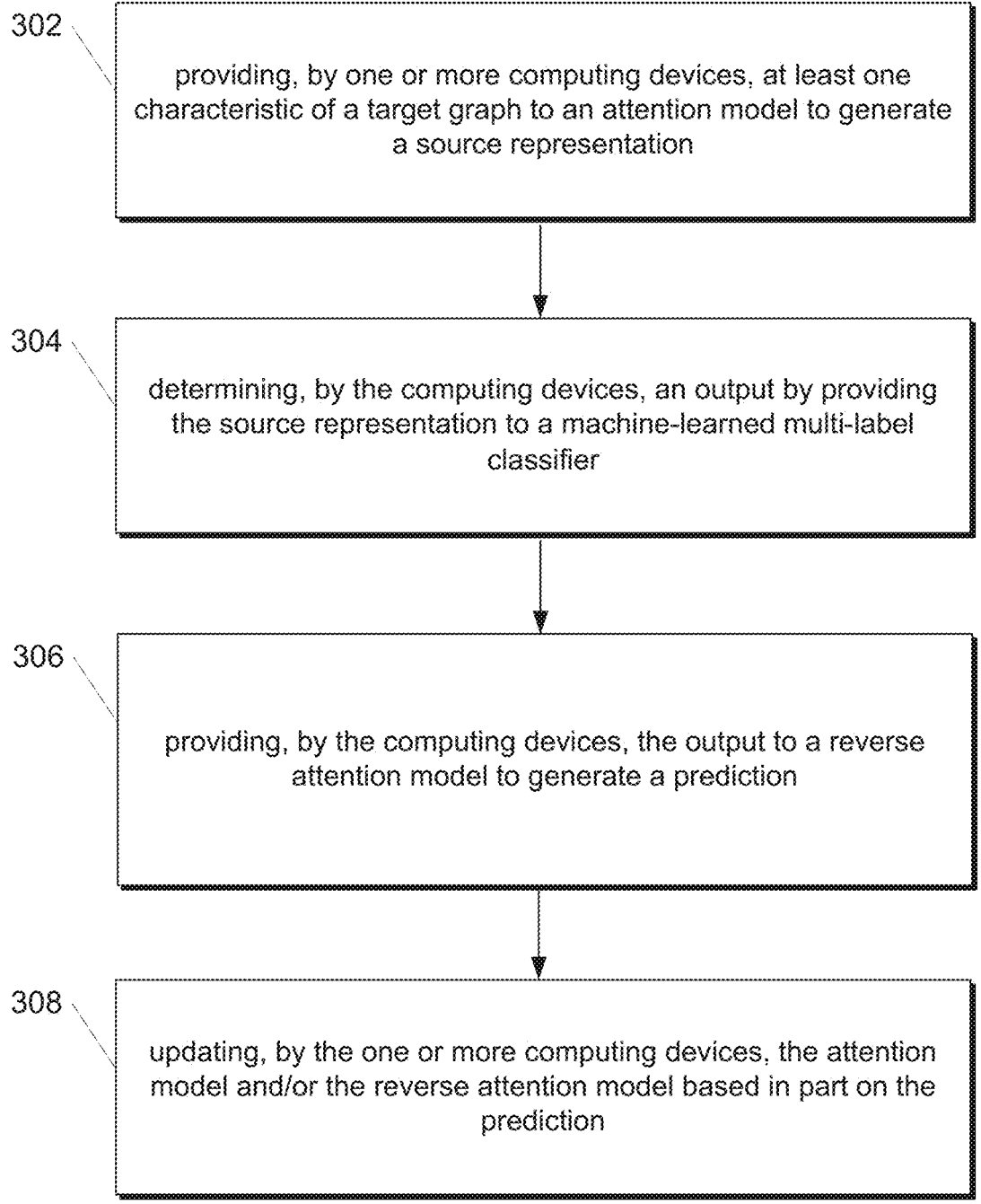
FIG. 3 depicts a flow chart diagram of an example method to training a target graph encoder according to example embodiments of the present disclosure.

FIG. 3 depicts a flow chart diagram of an example method for training a target graph encoder according to example embodiments of the present disclosure. Again, although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system provides at least one characteristic of a target graph to an attention model to generate a source representation.

At 304, the computing system determines an output by providing the source representation to a source graph encoder (e.g., a multi-label classifier.)

At 306, the computing system provides the output of the source graph encoder to a reverse attention model to generate a prediction.

At 308, the computing system updates the attention model and/or the reverse attention model based in part on the prediction.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for determining graph similarity, the computer-implemented method comprising:
   obtaining, by one or more computing devices, a plurality of source graphs and a target graph;
   training, by the one or more computing devices, a source graph encoder for each source graph to generate a plurality of source graph encoders respectively associated with the plurality of source graphs, wherein the source graph encoder for each source graph is configured to predict one or more characteristics of the corresponding source graph based on an input that describes a portion of the corresponding source graph;
   training, by the one or more computing devices, a target graph encoder for each source graph to generate a plurality of target graph encoders respectively associated with the plurality of source graphs, wherein each target graph encoder is configured to predict one or more characteristics of the target graph based on an input that describes a portion of the target graph, and wherein the target graph encoder associated with each source graph comprises:
      an attention model configured to receive the input that describes the portion of the target graph and to convert the portion of the target graph into a portion of the corresponding source graph;
      the source graph encoder associated with the corresponding source graph; and
      a reverse attention model configured to receive and process an output of the corresponding source graph encoder to predict the one or more characteristics of the target graph; and
   generating, by the one or more computing devices, an embedding for the target graph, wherein the embedding comprises a plurality of performance values respectively for the plurality of target graph encoders.

2. The computer-implemented method of claim 1, further comprising:
   performing, by the one or more computing devices for each of one or more additional target graphs, said training of the target graph encoder for each source graph and said generating of the embedding to generate one or more additional embeddings respectively for the one or more additional target graphs; and
   comparing, by the one or more computing devices, the embedding generated for the target graph with at least one of the additional embeddings associated with at least one of the additional target graphs to determine a similarity between the target graph and the at least one of the additional target graphs.

3. The computer-implemented method of claim 1, wherein training the target graph encoder for each source graph comprises iteratively updating, by the one or more computing devices, the target graph encoder for a number of rounds using an objective function, wherein the source graph encoder is fixed for each of the number of rounds.

4. The computer-implemented method of claim 1, wherein the target graph is one of the plurality of source graphs.

5. The computer-implemented method of claim 1, wherein the source graph encoder for each source graph comprises a node-to-edges encoder that is configured to receive an input that identifies one or more nodes of the corresponding source graph and, in response, to predict each neighboring node that neighbors the one or more nodes of the corresponding source graph.

6. The computer-implemented method of claim 1, wherein the source graph encoder for each source graph comprises an edge-to-node encoder that is configured to receive an input that identifies one or more edges of the corresponding source graph and, in response, to predict a source and destination node for each of the one or more nodes of the corresponding source graph.

7. The computer-implemented method of claim 1, wherein the source graph encoder for each source graph comprises a neighborhood encoder that is configured to receive an input that identifies one or more nodes of the corresponding source graph and, in response, to predict a neighborhood of nodes or edges that surround each of the one or more nodes of the corresponding source graph, wherein the neighborhood of nodes or edges comprises nodes or edges discoverable through performance of a random walk process.

8. The computer-implemented method of claim 1, wherein the one or more characteristics of the corresponding source graph predicted by the source graph encoder comprise one or more attributes of one or more nodes or edges of the corresponding source graph, and wherein training the source graph encoder for each source graph comprises evaluating a loss function that compares the one or more attributes predicted by the source graph encoder for the one or more nodes or edges of the source graph to one or more ground truth attributes of the one or more nodes or edges of the source graph.

9. The computer-implemented method of claim 1, wherein the one or more characteristics of the target graph predicted by each target graph encoder comprise one or more attributes of one or more nodes or edges of the target graph, and wherein training the target graph encoder for each source graph comprises evaluating a loss function that compares the one or more attributes predicted by each target graph encoder for the one or more nodes or edges of the target graph to one or more ground truth attributes of the one or more nodes or edges of the target graph.

10. The computer-implemented method of claim 1, wherein the source graph encoder comprises a first neural network, the attention model comprises a second neural network positioned prior to the first neural network, and the reverse attention model comprises a third neural network positioned subsequent to the first neural network.

11. The computer-implemented method of claim 10, wherein one or more of the first, second, or third neural networks comprise a multi-label classifier.

12. A computing system configured to perform graph comparison, the computing system comprising:
   one or more processors; and
   one or more non-transitory computer-readable media that collectively store instructions that, when executed by the one or more processors cause the computing system to perform operations, the operations comprising:
      training a source graph encoder using at least one source graph;
      training a target graph encoder, wherein training the target graph encoder comprises:
         providing at least one characteristic of a target graph to an attention model to generate a source representation;
         determining an output of the source graph encoder by providing the source representation to the source graph encoder;

providing the output of the source graph encoder to a reverse attention model to generate a prediction; and updating one or both of the attention model and the reverse attention model based in part on the prediction; and generating an embedding for the target graph, wherein the embedding comprises a performance value of the target graph encoder, and wherein the performance value is determined based in part on comparing the prediction to the target graph.

13. The computing system of claim 12, wherein the source graph encoder comprises a neural network.

14. The computing system of claim 12, wherein the prediction comprises a prediction of an attribute of the target graph.

15. The computing system of claim 14, wherein the attribute includes the at least one characteristic provided to the attention model.

16. The computing system of claim 12, wherein training the source graph encoder comprises training at least one machine-learned multi-label classifier for each of the at least one source graphs to generate a plurality of machine-leaned multi-label classifiers, wherein each machine-learned multi-label classifier is associated with one source graph.

17. The computing system of claim 12, wherein updating one or both of the attention model and the reverse attention model based in part on the prediction comprises: comparing the prediction to the target graph.

18. A non-transitory computer-readable medium that stores instructions for determining graph similarity that, when executed by one or more computing devices, cause the one or more computing devices to perform operations, the operations comprising:

obtaining a plurality of source graphs and a target graph;

training a source graph encoder for each source graph to generate a plurality of source graph encoders each associated with a corresponding source graph, wherein the source graph encoder for each corresponding source graph predicts one or more characteristics of the corresponding source graph based on an input that describes a portion of the corresponding source graph;

training a target graph encoder for at least one of the source graph encoders, wherein the target graph encoder is configured to predict one or more characteristics of the target graph based on an input that describes a portion of the target graph, and wherein training the target graph encoder comprises:

providing at least one characteristic of a target graph to an attention model to generate a source representation;

determining an output by providing the source representation to at least one of the source graph encoders;

providing the output to a reverse attention model to generate a prediction; and updating the attention model, the reverse attention model, or both based in part on the prediction; and generating an embedding for the target graph, wherein the embedding comprises a plurality of performance values respectively for each target graph encoder.

19. The non-transitory computer-readable medium of claim 18, wherein the operations further comprise:

identifying a similar graph based at least in part on comparing the embedding for the target graph to one or more additional embeddings generated for one or more additional graphs.

20. The non-transitory computer-implemented method of claim 18, wherein training the target graph encoder comprises generating a plurality of target graph encoders, each of the target graph encoders associated with the source graph encoder used in determining the output while training the target graph encoder.

* * * * *